United States Patent
Kraft et al.

(10) Patent No.: US 11,149,538 B2
(45) Date of Patent: Oct. 19, 2021

(54) SYSTEMS AND METHODS FOR DETERMINING BENDING OF A DRILLING TOOL, THE DRILLING TOOL HAVING ELECTRICAL CONDUIT

(71) Applicants: Kersten Kraft, Celle (DE); Andreas Hartmann, Celle (DE); Eugen Medvedev, Celle (DE)

(72) Inventors: Kersten Kraft, Celle (DE); Andreas Hartmann, Celle (DE); Eugen Medvedev, Celle (DE)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 179 days.

(21) Appl. No.: 16/288,794

(22) Filed: Feb. 28, 2019

(65) Prior Publication Data
US 2019/0271223 A1    Sep. 5, 2019

Related U.S. Application Data

(60) Provisional application No. 62/636,993, filed on Mar. 1, 2018.

(51) Int. Cl.
*G01V 3/34* (2006.01)
*G01V 3/28* (2006.01)
(Continued)

(52) U.S. Cl.
CPC .............. *E21B 47/024* (2013.01); *E21B 7/04* (2013.01); *E21B 47/14* (2013.01); *G01V 3/28* (2013.01); *G01V 3/34* (2013.01)

(58) Field of Classification Search
CPC ........ E21B 17/00; E21B 47/007; E21B 47/13; E21B 7/06; E21B 47/00; E21B 47/022; E21B 47/02; G01V 3/18
See application file for complete search history.

(56) References Cited

U.S. PATENT DOCUMENTS

| 5,235,285 A | 8/1993 | Clark et al. |
| 6,191,586 B1 | 2/2001 | Bittar |

(Continued)

FOREIGN PATENT DOCUMENTS

| GB | 2322199 A | 8/1998 |
| WO | 2016099989 | 6/2016 |

OTHER PUBLICATIONS

Borghi et al., "New Logging-While-Drilling Azimuthal Resisitivity and High Resolution Imagining in Slim Holes"; 10th Offshore Mediterranean Conference; Ravenna, Italy; Mar. 23, 2011; 9 pages.

(Continued)

*Primary Examiner* — Brandi N Hopkins
(74) *Attorney, Agent, or Firm* — Cantor Colburn LLP (57) ABSTRACT

A system for determining bending of a drilling tool includes at least one element attached to the drilling tool and the at least one element includes a magnetic material, and at least one electrical conduit in the drilling tool and electro-magnetically coupled to the at least one element. The system also includes at least one signal source that feeds a signal into the electrical conduit and a measurement system that: measures at least one property of the signal in the electrical conduit as the signal source feeds the signal; and determines the bending of the drilling tool based on the measured property of the signal.

20 Claims, 9 Drawing Sheets

(51) Int. Cl.
*E21B 47/024* (2006.01)
*E21B 47/14* (2006.01)
*E21B 7/04* (2006.01)

(56) References Cited

U.S. PATENT DOCUMENTS

| | | |
|---|---|---|
| 6,586,939 B1 | 7/2003 | Fanini et al. |
| 7,138,803 B2 | 11/2006 | Bittar |
| 7,420,367 B2 | 9/2008 | Bespalov et al. |
| 8,164,339 B2 | 4/2012 | Fang et al. |
| 8,207,738 B2 | 6/2012 | Wang |
| 8,220,540 B2 | 7/2012 | Freyer |
| 9,075,157 B2 | 7/2015 | Gorek |
| 9,091,791 B2 | 7/2015 | Rabinovich et al. |
| 9,129,728 B2 * | 9/2015 | Edbury .................. E21B 44/02 |
| 9,217,809 B2 | 12/2015 | Simon |
| 9,268,053 B2 | 2/2016 | Wang |
| 9,354,347 B2 | 5/2016 | Reiderman et al. |
| 9,389,332 B2 | 7/2016 | Jang |
| 2005/0150689 A1 | 7/2005 | Jogi et al. |
| 2012/0105076 A1 | 5/2012 | Li et al. |
| 2012/0242342 A1 | 9/2012 | Rabinovich et al. |
| 2013/0076526 A1 | 3/2013 | Schuberth et al. |
| 2013/0301388 A1 | 11/2013 | Hartmann |
| 2013/0304384 A1 * | 11/2013 | Rabinovich ............ G01V 11/00 702/6 |
| 2016/0215610 A1 * | 7/2016 | Lange .................... G01N 27/72 |
| 2016/0238731 A1 | 8/2016 | Chopra et al. |
| 2017/0131433 A1 | 5/2017 | Hartmann et al. |

OTHER PUBLICATIONS

International Search Report for Application No. PCT/US2019/0202277; dated Jun. 12, 2019, 3 pages.

Written Opinion of the International Searching Authority; PCT Application No. PCT/US2019/020227; dated Jun. 12, 2019; 5 pages.

* cited by examiner

SYSTEMS AND METHODS FOR DETERMINING BENDING OF A DRILLING TOOL, THE DRILLING TOOL HAVING ELECTRICAL CONDUIT

CROSS REFERENCE TO RELATED APPLICATIONS

This application claims the benefit of an earlier filing date from U.S. Provisional Application Ser. No. 62/636,993 filed Mar. 1, 2018, the entire disclosure of which is incorporated herein by reference.

BACKGROUND

In downhole operations such as drilling, geosteering and measurement-while-drilling (MWD) operations, sensor devices are included with a borehole string that measure various parameters of a formation and/or a borehole. Such sensor devices are typically arranged to have a desired orientation or alignment, and resulting measurements are analyzed based on such alignments. Various environmental effects and downhole forces can cause bending or other deformation of a downhole component, and consequently can result in misalignment of sensors devices, which can negatively affect measurement data.

Bending or bending moments of a downhole tool are usually measured by strain gauges, which is a well-known and well understood technology.

In some cases, an MWD downhole tool is used to measure the resistivity of the surrounding formation. Such tools are equipped with antennas to transmit or receive electromagnetic signals. The transmitter antennas are sending an electromagnetic signal into the formation interacting with the formation and cause some electromagnetic phenomena such as Eddy Currents or electromagnetic field propagation. The receiver antennas detect an electromagnetic signal caused by the created phenomena. To increase the depth of detection of such a downhole tool the transmitted signal may be of a "low" frequencies (e.g., less than 80 kHz). Low frequencies and depth of detection require large spacing between transmitter and receiver. The large spacing between transmitter and receiver antenna may lead to misalignment of transmitter and receiver antenna in case of bending of the downhole tool.

SUMMARY

Disclosed herein is a system for determining bending of a drilling tool includes at least one element attached to the drilling tool and the at least one element includes a magnetic material, and at least one electrical conduit in the drilling tool and electro-magnetically coupled to the at least one element. The system also includes at least one signal source that feeds a signal into the electrical conduit and a measurement system that: measures at least one property of the signal in the electrical conduit as the signal source feeds the signal; and determines the bending of the drilling tool based on the measured property of the signal.

Also disclosed is a method of determining a bending of a drilling tool, the method comprising: feeding a signal into an electrical conduit, using a signal source, wherein the electrical conduit is located in the drilling tool; wherein the drilling tool having at least one element attached to it; the at least one element includes a magnetic material; wherein the electrical conduit is electro-magnetically coupled to the at least one element; measuring at least one property of the signal in the electrical conduit as the signal is fed into the electrical conduit; and determining the bending of the drilling tool based on the at least one measured property of the signal.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein like elements are numbered alike, in which:

DETAILED DESCRIPTION

While portions of the following discussion relate to measuring bending of a downhole tool such as a portion of a bottom hole assembly or a section of a drill string (e.g., a pipe segment or downhole tool such as a bottom hole assembly, resistivity tool and the like), the teachings herein are not so limited and may be applied in a situation where a portion of an implement may need to have bending measurements made thereof. Examples include rotor blades of wind power stations or aircrafts, all kind of pipes industrial and medicine, shafts and cables in general. The previous list is not exclusive and not limiting to the application of the teachings herein. The term bending in this disclosure describes the behavior of a slender structural element subjected to an external load applied perpendicular to a longitudinal axis of the element. The slender structural element is this disclosure is a downhole assembly or portions thereof. The external load is applied by the conveying the downhole assembly through a curved borehole or by drilling a curved borehole with the drilling assembly.

Figure 1:
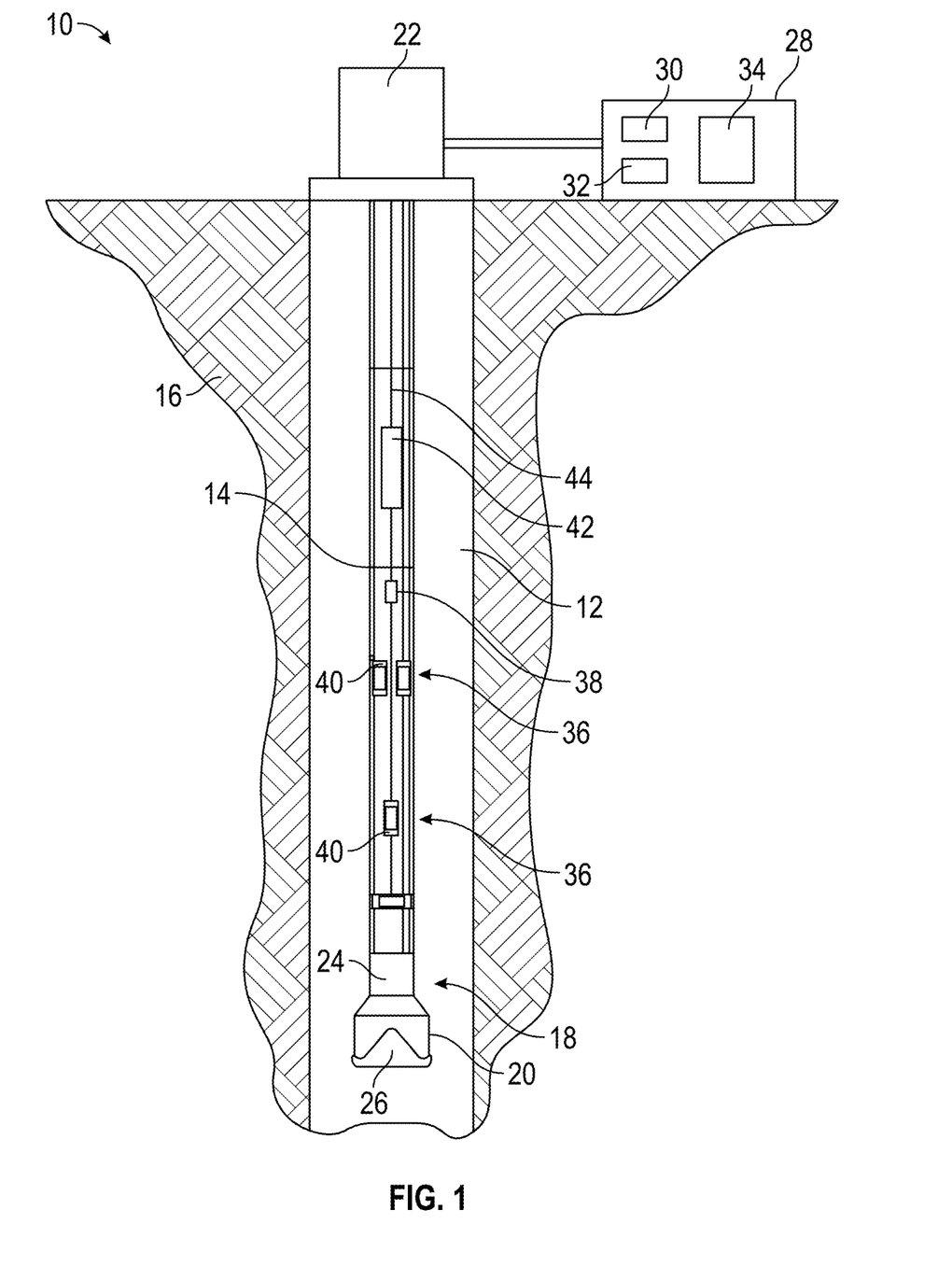
FIG. 1 is an exemplary embodiment of a drilling system including a drill string disposed in a borehole in an earth formation.

Referring to FIG. 1, an exemplary embodiment of a downhole drilling system 10 disposed in a borehole 12 is shown. Much of this system may be implemented in embodiments of the present invention while others may be omitted due to the disclosure herein.

In FIG. 1, a drill string 14 is disposed in the borehole 12, which penetrates at least one earth formation 16. Although the borehole 12 is shown in FIG. 1 to be of constant diameter, the borehole is not so limited. For example, the borehole 12 may be of varying diameter and/or direction (e.g., azimuth and inclination). The drill string 14 is made from, for example, a pipe or multiple pipe sections. The system 10 and/or the drill string 14 include a drilling assembly 18. Various measurement tools may also be incorporated into the system 10 to affect measurement regimes such as wireline measurement applications or logging-while-drilling (LWD) applications. Formation evaluation measurement tools (FE tools/sensors) 38 are used in LWD applications as well as in wireline applications. FE tools may comprise a resistivity sensor, NMR sensor, acoustic or seismic sensor, nuclear sensor (neutron porosity, gamma density), gamma sensor and a formation sampling tool.

The drilling assembly 18, which may be configured as a bottomhole assembly (BHA), includes a drill bit 20 that is attached to the bottom end of the drill string 14 via various drilling assembly components. The drilling assembly 18 is configured to be conveyed into the borehole 12 from a drilling rig 22. The drilling assembly also includes various components for structural and operational support to the drill bit 20, such as a drill bit body 24 operably connected to cutters 26, a drilling motor (also referred to as a mud motor), and a stabilizer or reamer.

A processing unit 28 is connected in operable communication with the drilling assembly 18 and may be located, for example, at a surface location, a subsea location and/or a surface location on a marine well platform or a marine craft. The processing unit 28 may also be incorporated with the drill string 14 or the drilling assembly 18, or otherwise disposed downhole as desired. The processing unit 28 may be configured to perform functions such as controlling the drilling assembly 18, transmitting and receiving data and monitoring the drilling assembly 18 and the drill string 14. The processing unit 28, in one embodiment, includes a processor 30, a data storage device (or a computer-readable medium) 32 for storing, data, models and/or computer programs or software 34.

The system 10 also includes one or more measurement assemblies 36 for measuring forces experienced by the drill string while downhole and/or in operation. Each assembly 36 may be able to measure one or more of WOB, TOB and bending forces. In prior art systems, a typical prior art bending sensor 40 is a strain gauge. The measurement assemblies 36 may also comprise a pressure sensor, a gravity sensor detecting acceleration and a magnetometer measuring the earth magnetic field.

The assembly 36 transmits signals to a processor in the form of, e.g., voltage changes, at a desired location. For example, the assemblies 36 may be coupled to a downhole electronics unit 42, which may receive signals from the assemblies 36 and transmit the data to a processing system such as the processing unit 28. Signals and data may be transmitted via any suitable transmission device or system, such as a cable 44. Other techniques used to transmit signals and data include wired pipe, electric and/or fiber optic connections, mud pulse, electromagnetic and acoustic telemetry.

In the following discussion, rather than or in addition to, the assembly 36, portions of an antenna system on the tool or pipe segment can be used to measure bending. Such a bending sensor may be used alternatively to well-known bending sensors, such as strain gauges. In one embodiment, the antenna system is part of a resistivity measurement system. That is, the FE tool 38 can be a resistivity tool in one embodiment.

The processing unit 28 is configured to analyze and/or transmit data to a user or other location for analysis. Such analysis includes estimating downhole parameters such as weight-on-bit (WOB), torque-on-bit (TOB) and bending forces/moments on portions of the drill string 14 or bending forces/moments on the bit (BOB). It shall be understood that in some embodiments, such processing may occur at processors other than that at the surface including, for example, at the downhole electronics unit 44. In such a case, the results of the analysis may be transmitted to the surface processing unit 28 for further action/processing or may cause the drilling assembly 18 to operate in different manner automatically without input from the processing unit 28. Measurements of parameters such as torque, TOB, WOB and bending can also be used to estimate other parameters such as drill string direction or deviation, and unwanted deformation such as buckling. Although embodiments are described in conjunction with drill string and drilling operations, including measurement-while-drilling (MWD) operations, they are not so limited. The apparatuses and methods described herein may be utilized with any component, including downhole components such as wireline tools that experience forces that need to be measured. In the following discussion some or all of the bending calculations can be done downhole. It shall be understood, however, that raw or amplified measurements can be made downhole and then processed at a surface computer.

It shall also be understood that bending of the tool can affect resistivity measurements. Thus, information related to bending can be used to correct or otherwise improve resistivity measurements. The effects of bending on resistivity measurements has been the subject of many patents and studies and is not discussed further herein. Examples of some patents and patent applications, all of which are incorporated herein by reference, that describe the effects of, or how to account for, bending of a tool in resistivity measurements includes: U.S. Patent Publication No. 20120242342 to Rabinovich, U.S. Patent Publication No. 20130301388A1 to Hartman, U.S. Patent Publication No. 20130076526A1 to Schuberth, U.S. Pat. No. 9,091,791 to Rabinovich, U.S. Pat. No. 9,075,157 to Gorek and U.S. Pat. No. 9,354,347 to Reiderman.

Based on the corrected resistivity measurements, a drilling decision such as a drilling speed or direction can be made and implemented in the system, the drilling system 10. Of course, in other contexts, the decisions that are made may not be drilling decision but, rather, decisions to direct the travel of an implement, such as a downhole tool including a disintegrating device, to which systems of the present teachings are coupled.

Further, in one embodiment, bending can be used as a standalone measurement. Such a measurement can be used to affect a drilling decision such as a drilling speed or direction which can be made and implemented in the drilling system 10. Of course, in other contexts, the decisions that are made may not be drilling decision but, rather, decisions to direct the travel of an implement to which systems of the present teachings are coupled.

Figure 2:
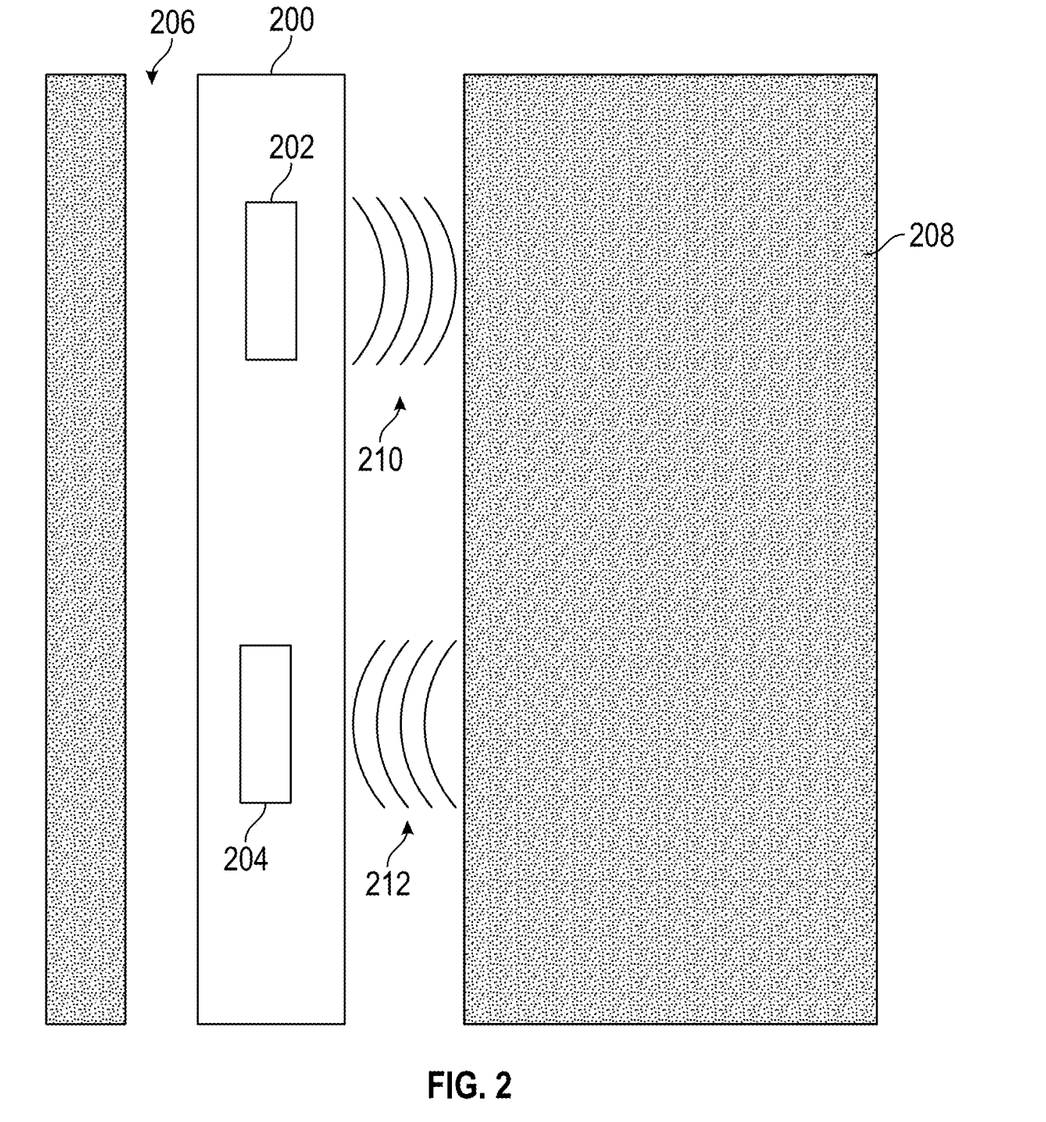
FIG. 2 shows a simplified resistivity tool in operation.

FIG. 2 shows an example of a drilling assembly segment 200 including a transmit antenna 202 and a receive antenna 204. The transmit and receive antennas 202, 204 may be part of the FE tool 38 shown in FIG. 1a.

The drilling assembly segment 200, such as a drilling tool, is disposed in a borehole 206 passing through a formation 208. Depending on the context, the drilling assembly segment 200 can be referred to as an elongated body. However, the term elongated body is not limited to drilling assembly segments and can be any body carried downhole either as a separate element or as part of another tool. The elongated body may either be the main body of the drilling assembly or any other elongated structure inside the drilling assembly. The elongated structure inside the drilling assembly may have elongated surfaces. The term elongated refers to a longitudinal axis of the drilling assembly or the borehole in which the drilling assembly is operated.

The transmit antenna 202 transmits electromagnetic waves 210 into the formation 208. Interaction between the transmitted waves 210 and the formation causes electromagnetic waves 212 to be received by the receive antenna 204. The orientation and location of the transmit 202 and receive 204 antennas can be reversed in some instances. Based on the electromagnetic waves 212 a current is induced in the receive antenna (204) also described as receiving a signal. Electrical properties of the formation 208 such as a resistivity, capacity or inductance can be determined by measuring the attenuation and/or phase-shift of the received signal compared to the transmitted signal. How such determinations are made is well known in the art and not discussed further herein.

The signal transmitted by the transmit antenna is an alternating signal that may have a frequency between 10 kHz and 30 kHz, 30 kHz and 50 kHz, 50 kHz and 100 kHz, 100 kHz and 400 kHz, 400 kHz and 1 MHz, or 1 MHz and 3 MHz. The signal shape is usually sine wave signal, but may have other shapes, such as triangular wave or saw-tooth wave.

Figure 3:
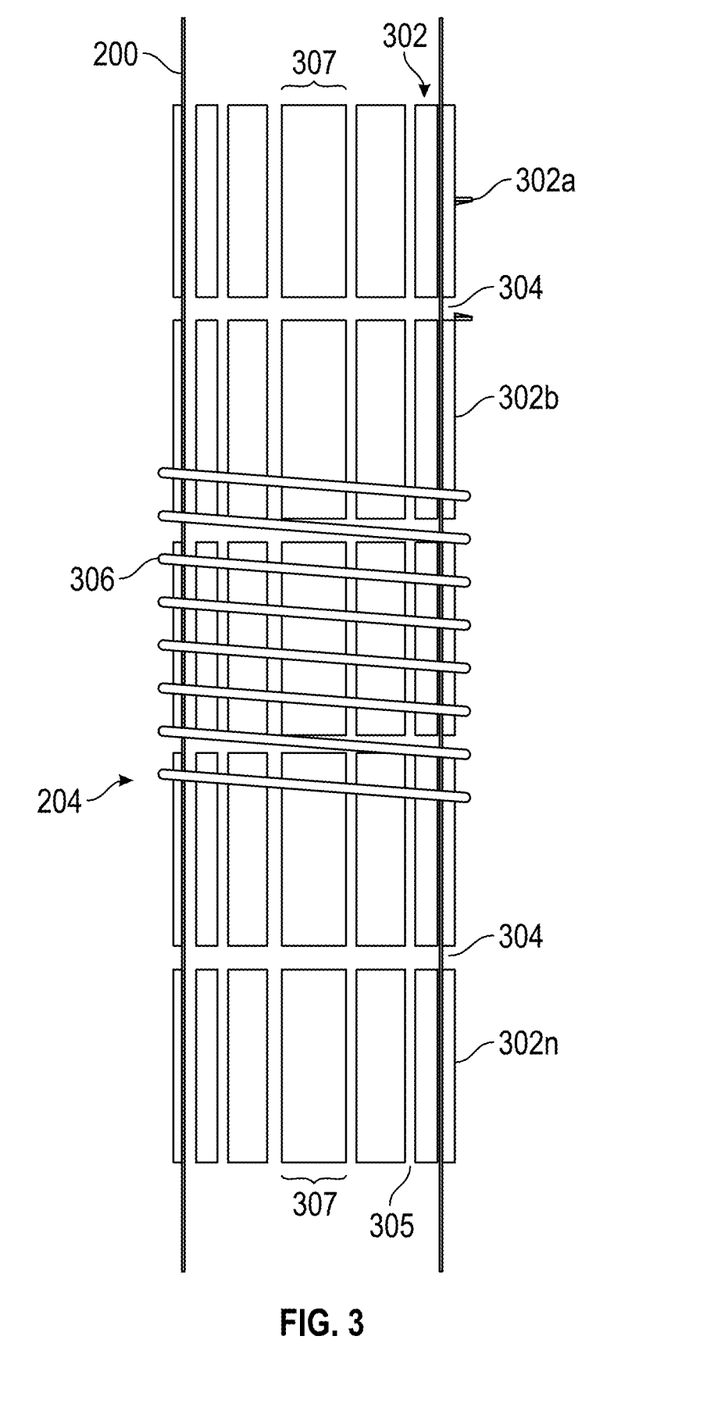
FIG. 3 shows an simplified and elongated body surrounded by magnetic material and a wire.

FIG. 3 is a simplified version of an antenna (e.g., receive antenna 204 as generally described above but this description also may apply to the transmit antenna 202). As illustrated, the antenna 204 includes an electrical conduit 306 that surrounds at least partially (and in some cases, completely surrounds) the drill pipe 200. As illustrated and the electrical conduit is a wire but this is for example, not limitation. In one embodiment, the antenna 204 includes magnetic elements 302 with high magnetic permeability, which are attached to the surface of the segment 200. Magnetic and soft magnetic materials in this application are defined as having a magnetic permeability that is greater than about 1.26*10-4 N/A2 (ferromagnetic or ferrimagnetic material). The magnetic or soft-magnetic material may also be corrosion resistant, such as Vacoflux 9CR from Vacuumschmelze GmbH and Co. In one embodiment, the magnetic elements 302 are formed of bricks and may also be called ferrites. The bricks can be solid in one embodiment. In embodiments the magnetic elements 302 may have alternative shapes, such as octothorpe, circular, curvilinear, or any kind of irregular shape. The magnetic elements 302 may be attached to the drill pipe segment by gluing using glue or adhesives, welding, or fixing using a fixing means, such as a clamp, screw, rivet, or strap.

As illustrated, the wire 306 is arranged such that it surrounds the magnetic elements 302. In one embodiment, to increase the reliability of the antenna construction and to reduce the temperature dependency, the antenna is built by multiple short magnetic elements (302a . . . 302n) instead of one long magnetic element. This construction results in gaps 304 and 305 between the single magnetic elements. The gaps 304 and 305 have a length (width of the gap). This gap increases the reliability of the antenna, but it may reduce the inductance of the antenna 204. The term "short magnetic elements" in this context refers to a length shorter than the extension of the electrical conduit in the antenna along the longitudinal axis of the downhole tool. The total length of the elongated body, which has the magnetic elements attached to it, does not need to be exactly the length of the elongated body, which is surrounded by the electrical conduit 306, it may be longer or shorter as illustrated in FIG. 3. Although, the a single magnetic element is shorter than the longitudinal extension of the electrical conduit, the length of the elongated body with magnetic elements attached to may be longer than the longitudinal extension of the electrical conduit.

The bending sensor will be more sensitive the more the density of magnetic material changes within the volume the electro-magnetic signal (received or transmitted) interacts with, here also referred to as interacting volume. The gap 304 is imperative in the bending sensor design of FIG. 3. It gets wider or smaller when the drill pipe segment 200 bends. The gap 305 may be created by using rigid magnetic elements that are brittle and can not easily follow a radius on the surface of the drill pipe segment. However, the gap 305 plays a significant role when only a strip 307 (FIG. 3) of magnetic elements may be attached to the surface of the drill pipe segment instead of attaching the magnetic elements around the circumference of the drill pipe segment. Attaching only a strip of magnetic elements to the drill pipe segment allows for identification of the azimuth of the bending. Attaching more than one strip of magnetic elements to the drill pipe segment at different angles along the circumference of the drill pipe body (e.g. 0° and 180°, or 0°, 90°, 180° and 270°) separated by gaps 305, allows identifying the azimuth with higher resolution.

The different strips may have different widths in the circumferential direction of the elongated body to identify the angle of the azimuth. The gaps between the strips in this specific embodiment may be wider than as indicated in FIG. 3. The gaps between the strips may be bigger than an angle of 10° or bigger than 20° along the circumference of the drill pipe segment.

In general the gap 304 and 305 may be straight gaps with gap widths/lengths either parallel or perpendicular to a longitudinal axis of the elongated body, or may be straight but inclined gaps with respect to the longitudinal axis of the elongated body or may be curved or any combination of curved and straight. Alternatively, the magnetic elements may be overlapping and the overlapping area of the magnetic elements may change with bending of the elongated body.

In the above it is assumed that each magnetic element 302 is a solid element and that gaps exist between the elements. In another embodiment, the magnetic elements 302 could be made of flexible material having a magnetic material such as a magnetic, ferromagnetic or ferrimagnetic material disposed therein. The flexible material may be a rubber or elastomer material or any other flexible material allowing to incorporate magnetic material such as magnetic particles inside the flexible material. As will become clear to the skilled artisan after consideration of the following, as the pipe segment 200 gets bent the magnetic elements move closer together as the width of the gaps between them gets smaller on one side of the pipe and larger on the other. This causes the density of magnetic material in the interacting volume to change. The density of magnetic material on one side of the pipe segment increases while it decreases on the opposite side. The magnetic resistance of the magnetic elements within the electrical conduit 306 increases on one side and decreases on the other. This change in the density of the magnetic material that interacts via the electromagnetic signal with the electrical conduit causing a change of magnetic resistance will affect the electrical parameters of the antenna such as the impedance (combination of resistance, inductance and capacitance), and, as such, its reception properties (sensitivity and frequency response). Based on measurements of received signals or antenna properties, an amount of bending can be determined. Due to the density change of magnetic material in the interacting volume of the electrical conduit of the antenna, at least one signal property of the received signal will change, either phase or amplitude. The same reason will make the antenna to change at least one antenna property, either inductance or capacity.

As shown in FIG. 3, the receive or transmit antenna (204, 202) of a resistivity tool can be used as a bending sensor by using a magnetic element in the antenna that is capable of changing the density of magnetic material per volume element (interacting volume). The volume element is in proximity to the electrical conduit 306 so that the electromagnetic field created by the electrical conduit 306 is interacting with the volume element when an electrical current flows through the electrical conduit 306.

The electrical conduit 306 may be a wire or any other electrical conductive pathway, such as a printed board track, a flat metal stripe, or a wire, as described in in FIG. 3. The electrical conduit 306 may be a straight conduit, a spiral coil, a cylindrical coil or any other 1-D, 2-D, or 3-D shaped pathway that are suitable to establish the interaction between the electrical conduit and the magnetic elements when an electric current is fed into the electrical conduit. The electrical conduit 306 does not need to have a specific orientation with respect to the pipe segment. The electrical conduit 306 may have an axis that is parallel to the longitudinal axis of the pipe segment (FIG. 3), but it does not need to. It may have an axis perpendicular to a longitudinal axis of the pipe segment or may have any angle between 0° and 90° to the longitudinal axis of the pipe segment. The magnetic flux created by the electrical current flowing through the electrical conduit 306 may include a component that is parallel to the elongated body or that is crossing the gap between two elements that are arranged along the elongated body or that has a component that is parallel to a direction of the magnetic element in which the density of magnetic material changes in case of bending of the elongated body. In embodiments the elongated body used in the bending sensor may be formed from the magnetic material.

Using the transmit or receive antenna (202, 204) of a resistivity tool (FIG. 2) as a bending sensor allows determination of bending exactly at the position of the antenna, increasing the accuracy of correction of resistivity measurements data for bending effects. Each of the transmit and receive antennas 202, 204 may be configured to measure bending, giving the opportunity to apply corrections on transmitted and received signals individually for each antenna.

Figure 4:
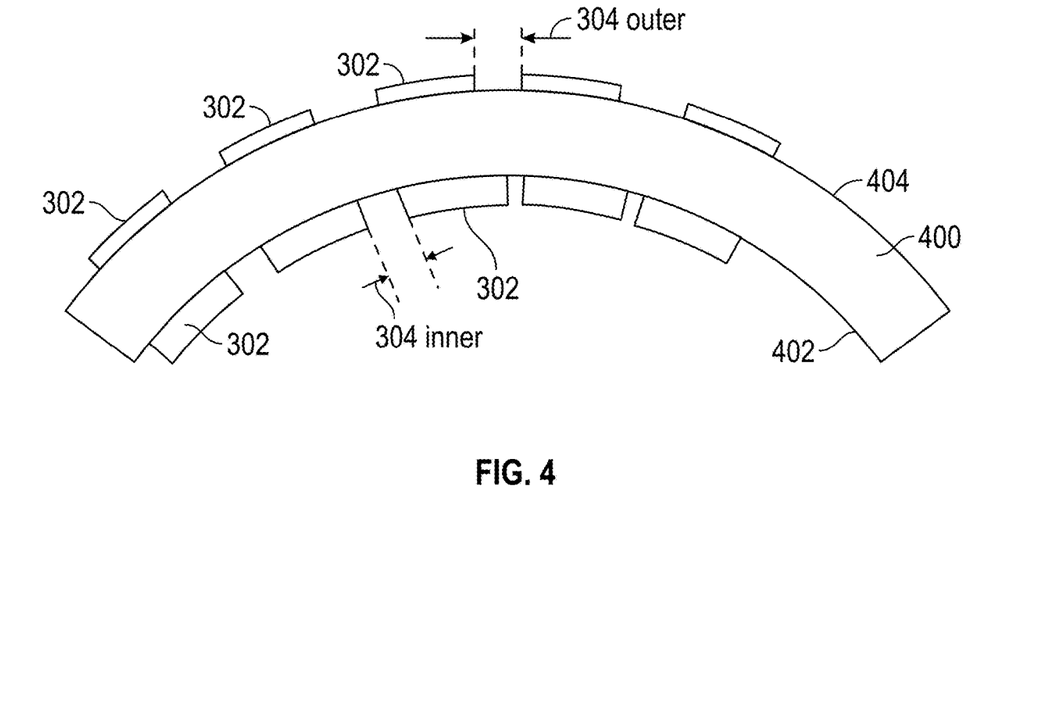
FIG. 4 shows a bent elongated body surrounded by magnetic material.

FIG. 4 shows an over-emphasized version of an elongated body 400 as it experiences a bend. Only the magnetic elements 302 are shown for clarity with the electrical conduit 306 is omitted. The body 400 is bent such that it has an inner portion 402 and an outer portion 404. The inner portion 402 could be referred to as inner diameter herein but is not to be limited to only circular bends. Similarly, the outer portion 404 could be referred to as outer diameter herein. The body 400 can be a pipe segment, a downhole tool or a portion of a bottom hole assembly, for example, or body carried by a pipe segment, a downhole tool, or a portion of a bottom hole assembly.

As the body 400 bends, the outer gap length 304 outer between the magnetic elements 302 on the outer portion 404 will increase as compared to when the pipe segment is not bent. Similarly, gap length 304 inner between the magnetic elements 302 on the inner portion 402 will decrease as compared to when the pipe segment is not bent. A typical length of the gap between two magnetic elements 302 is between 0.5 mm to 2 mm, 2 mm to 4 mm, 4 mm to 8 mm, 8 mm to 15 mm, 15 mm to 20 mm. The magnetic elements in this brick type element embodiment typically have dimensions between 0.5 cm to 1 cm, 1 cm to 1.5 cm, 1.5 cm to 2 cm, or 2 cm to 4 cm.

The above description has been based on having magnetic elements that contain at least some magnetic material and that include gaps between them. In another embodiment, the magnetic elements are made of flexible material with a magnetic material disposed therein. An example of two such magnetic elements 500/502 are shown in normal and bent configurations in FIGS. 5A and 5B, respectively. The magnetic elements are shown being on either side of a body 512 in FIG. 5A. The body could be a pipe segment, a downhole tool or a portion of a BHA, for example, a body carried by a pipe segment. As shown in one embodiment below, the body (e.g., elongated body) 512 may be a separate element carried in the BHA or other downhole tool. The body 512 does not need to be cylindrical as usually used for an antenna of a receiver or transmitter of a resistivity tool. It may be any kind of elongated body, such as an angular body or combinations of angular and cylindrical. It may not comprise a straight but curved axis, meaning the elongated body may have a static bend while the pipe segment, in which it is disposed, is straight with no bend. The elongated body 512 does not need a constant diameter along its longitudinal extension.

In the case the magnetic elements are flexible, the flexible element may be attached to the elongated body 512 by gluing using glue or adhesives, welding, or fixing using a fixing means, such as a clamp, screw, rivet, strap, or clamp.

Figure 5A:
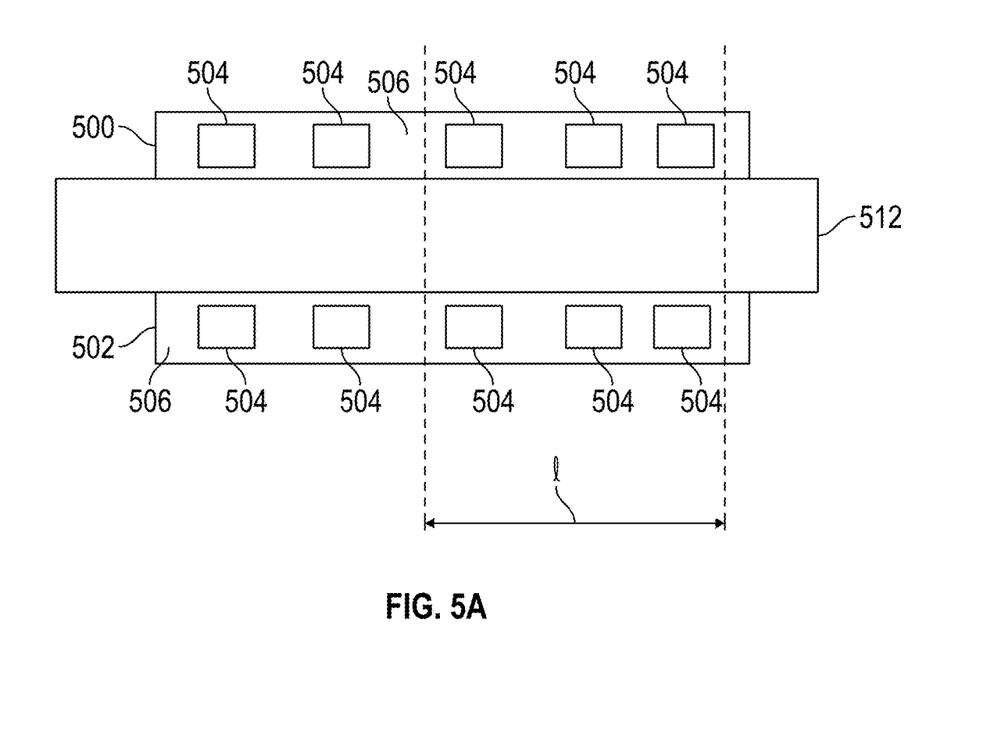
FIG. 5A shows an elongated body surrounded by elements containing a magnetic material.
Figure 5B:
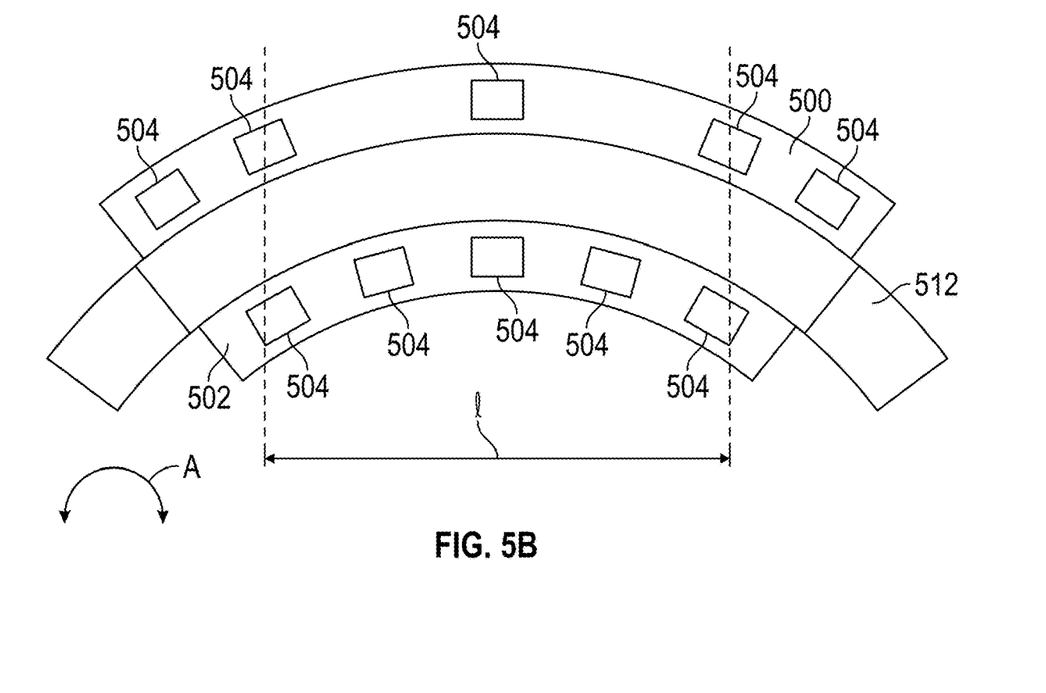
FIG. 5B shows the elongated body of FIG. 5A in a bent configuration.

In FIGS. 5A and 5B, each element 500/502 includes magnetic material 504 disposed in a flexible carrier/substrate 506, also referred to as flexible magnetic element. The carrier 506 can be formed of solid or flexible bar, strip or rod in one embodiment. As shown, the elements 500/502 includes a density of 3 units of magnetic material per unit length (1) in FIG. 5A.

In FIG. 5B, the elongated body 512 has been bent in the direction indicated by arrow A. The density per unit length 1 in element 502 is 5 units of magnetic material 504 and it is about 2 in element 500. This shows that bending can increase the density of magnetic material in a unit length (e.g., in a length that the electrical conduit surrounds the elements) as the body 512 is bent on the inner side of the bend and decrease the density on the other.

Instead of using a bar, strip or rod of flexible magnetic material as the magnetic element, the elongated body 512 may have the flexible carrier around the whole circumference, like a sleeve (not shown). A bending sensor using a bar, strip or rod shaped flexible magnetic element allows determining the azimuth of the bending while using a sleeve shape flexible magnetic element provides azimuthly independent bending measurements. In alternative embodiments to the embodiment illustrated in FIGS. 5A and 5B may combine a flexible magnetic element with at least one gap. In embodiments a plurality of flexible magnetic element rings around the circumference may be attached to the elongated body (not shown). The plurality of rings are separated from each other by gaps around the circumference of the elongated body.

The influence of the gap length between the magnetic elements (or distance between magnetic material 504 in an element) to the resulting inductance decreases the larger the gap length/distance is.

Figure 6:
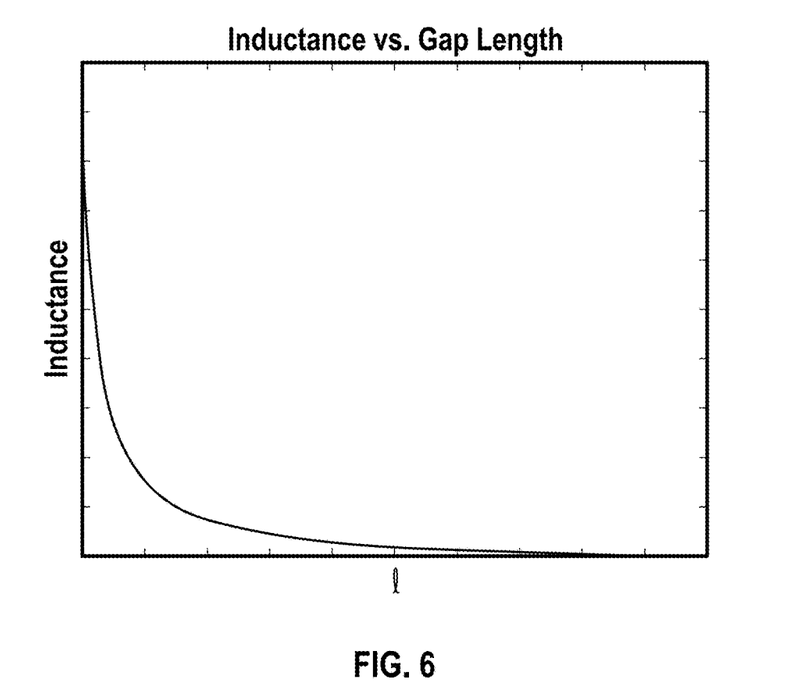
FIG. 6 is a graph of inductance versus gap length.

FIG. 6 shows generally, inductance L change versus gap length. The relationship is non-linear and is generally describable as following a L~1/(gap length). Of course, this can also be expressed as L~1/density as the skilled artisan will understand from examination of FIGS. 5A/5B. As the inductance change versus gap length relationship is a non-linear function and is relative to the geometry of the magnetic elements the relationship is not limited to the description mentioned above. Any other non-linear functions are possible and applicable.

The graph shown in FIG. 6 can lead to the following generalizations: 1) a gap length (l) decrease of Δl causes the inductance L to increase according to ΔL(~Δl) and, similarly, an increase of l by Δl causes the inductance L to decrease according to ΔL(Δl) with the function generally following the graph in FIG. 6.

From the above, it is clear that the overall inductance will change when the antenna (combination of magnetic elements and electrical conduit) gets bent. Any change of the antenna inductance will cause a change in the signal level or phase of the signal detected by the antenna or any other signal, which is affected by the antenna inductance. Therefore, the signal amplitude and/or phase for the received signal or any other internal signal, which passes through the antenna, will change as the antenna gets bent. In one embodiment, a table or other set of measurements can be created at the surface or other location where an input signal is provided to the antenna. The amount of a received signal will vary with inductance/bending for a particular tool and can be recorded. Comparing the measurements in the table (or other storage format) to real time measurements can allow an operator to measure pure bending using an electrical conduit (such as in an antenna that is part of a resistivity tool) instead of using strain gauges. In an alternative embodiment the signal amplitude and/or phase is used to create a mathematical description of the dependency of signal property (or antenna inductance) and amount of bending. The measured signal properties for a known bending of the elongated body are used to apply mathematical curve fitting methods (e.g. linear or polynomial regression) to determine a mathematical equation that allows to calculate bending depending on the measured signal property. The calibration of the antenna for bending measurement purposes may be performed in a lab or in a borehole for which the curvature is known (e.g., bending is known). In the following application of the antenna (e.g. in a downhole run) the equation is used to calculate the bending.

Of course, using the antenna (either transmitter coil or receiver coil) of a resistivity tool for the system is just one possible embodiment and does not limit the coil to being part of a resistivity tool. As will be understood, the measurement of bending can be used by a drill operator (either human or computer) to make drilling decisions or determine borehole and/or bottom hole assembly conditions. The decision can include, but is not limited to, a drilling speed or direction, a weight or torque on bit to be applied or a variation in any other parameter used to control a drilling process. The borehole property comprises borehole curvature (dog leg severity and inclination), depth and azimuth of the borehole trajectory. The BHA properties comprises bending and azimuth of the bending. The azimuth of the bending may be referenced to the toolface of the BHA, which is usually provided in degree angle from a reference point on the BHA.

The bending may be measured time dependent. Time dependent bending measurements may be used to determine fatigue or lifetime estimation. As a BHA is rotated in a borehole while being bended due to the curved borehole trajectory, fatigue loads are significant and can reduce the lifetime of the bottom hole assembly, leading to downhole failures implying financial losses.

In one embodiment, estimation of the bending is independent from the tool measurement and the antenna signal detection. This may occur, for example, when the bending estimate is made using a portion of a resistivity tool. Therefore, a signal with a different frequency than used for resistivity measurements may be used to estimate the bending. An antenna as used here is in the first approximation a coil and every coil is described by a frequency dependent inductance such as that shown in FIG. 7. The peak of this curve represents the resonance frequency of the antenna.

In another embodiment, no resistivity measurement is made at all. Only one assembly of magnetic material and electrical conduit surrounding it is used, purely for a bending measurement. Several of these assemblies may be distributed along the drill string and/or the BHA.

In another embodiment, the electrical conduit may not surround a magnetic element, but be placed next to it. This may be advantageous to save space. In general it is preferable that the electrical conduit is electro-magnetically coupled to the bending sensitive magnetic elements.

In another embodiment the magnetic field into the magnetic elements is created by means of any kind of permanent magnet and is measured by using any kind of electrical sensors to measure magnetic field strength electrically, like hall effect sensors or others state of the art.

Figure 8:
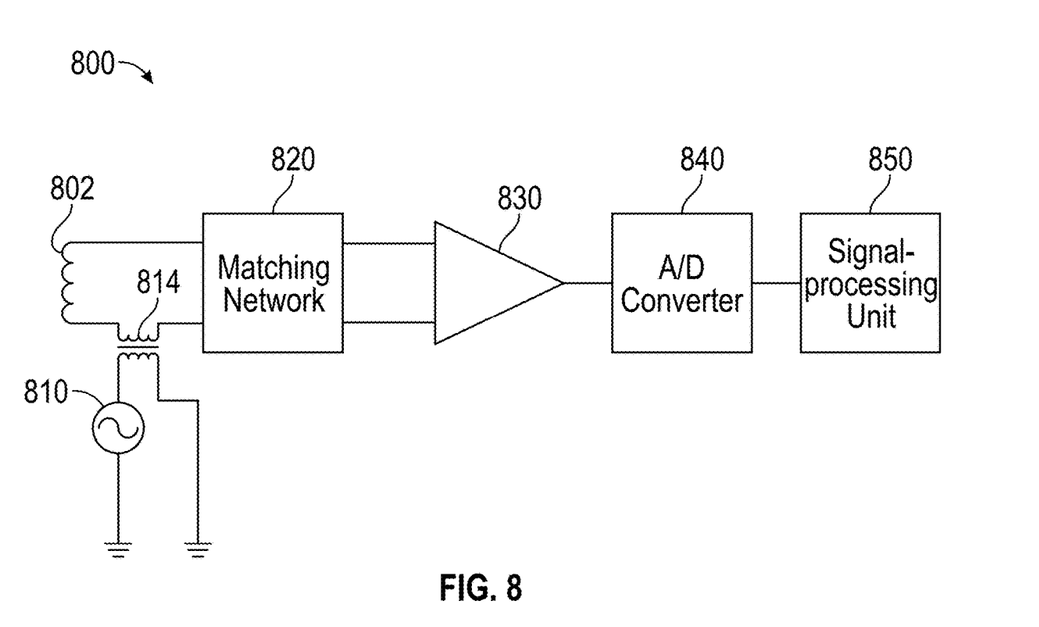
FIG. 8 is a schematic of system for measuring bending according to one embodiment.

FIG. 8 shows an example of bending measurement system or bending sensor 800 that utilizes an antenna 802. In one embodiment, the antenna is either a transmit or a receive antenna of a resistivity tool. It shall be understood that the antenna 802 comprises one or more magnetic elements. An electrical signal source 810 generates a sine wave shaped input signal (yin). This signal may be fed into the antenna circuitry 802 by a coupling transformer 814. In alternative embodiments the electrical signal source is connected to the electrical conduit of the antenna by a hard wired connection (galvanically connected). The coupled signal is influenced by changes on the antenna parameter of the antenna 802. That is, the change in inductance of the antenna 802 due to bending will affect the amount of signal from the signal source 810 that is coupled into the antenna 802. The system also includes a matching network 820. The matching network is coupled (e.g. connected) to the electrical conduit. The matching network 820 matches the input impedance of matching network 820 to impedance of the antenna 802 at certain frequencies.

Figure 9:
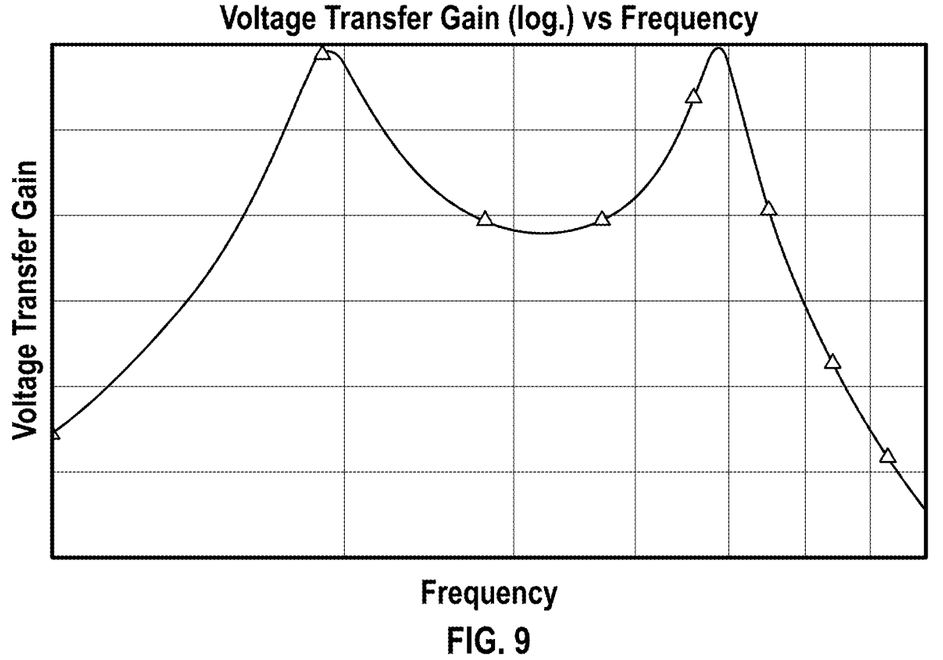
FIG. 9 is a graph showing voltage transfer gain versus frequency.

A voltage transfer gain of a matching network is shown in FIG. 9. This matching network is optimized for two frequencies, that means that the gain is maximized or the losses are minimized if the signal frequency is located at one of the shown peeks or again close to the resonance frequency.

Referring again to FIG. 8, the output of the matching network 820 is connected to an amplifier 830. This amplifier 830 can include any needed analog preprocessing of the signal, like filtering and amplification but is not limited to the mentioned functions. The analog preprocessed signal gets converted to a digital representation of the analog signal by the Analog to Digital (A-to-D) Converter 840. A Digital Signal Processor (DSP) 850 can be included to process the digital representation of the analog signal. The DSP can be located downhole or at the surface or split between the two.

This digital signal processing performed by the DSP 850 can include the calculation of any required measurement results and the bending estimation, based on the signal component. As discussed above, such bending estimation can be achieved by comparing the amount of signal received based on a known input from the signal source to an actual signal received while in operation. To that end, in one embodiment, the DSP 850 compares the output of the amplifier/A-to-D converter to determine a change in received electrical signal to the signal being provided by the signal source 810. The received signal can be compared to a table or other store of measured values made with different tool bends to determine an amount of bending on the tool. Alternatively, the received signal can be used as input for an equation that was determined by curve fitting methods to calculate the bending.

In one embodiment, the matching network 820, amplifier 830, A/D converter 840 and DSP 850 are contained in a resistivity device. In others, the elements are included in their own housing.

The sensitivity of the bending estimation can be increased when a frequency, generated by the signal source 810 is selected, which is on a falling slope of the voltage transfer gain function of the matching network (FIG. 9) or close to resonance frequency of the circuitry comprising the antenna 802, the coupling transformer 814 and the matching network 820. Aspects of the signal processing for the measurement signals, like auto-cancellation of the bending estimation signal for the measurement signal processing, can be considered at the frequency selection for the bending estimation signal.

Figures 10A, 10B:
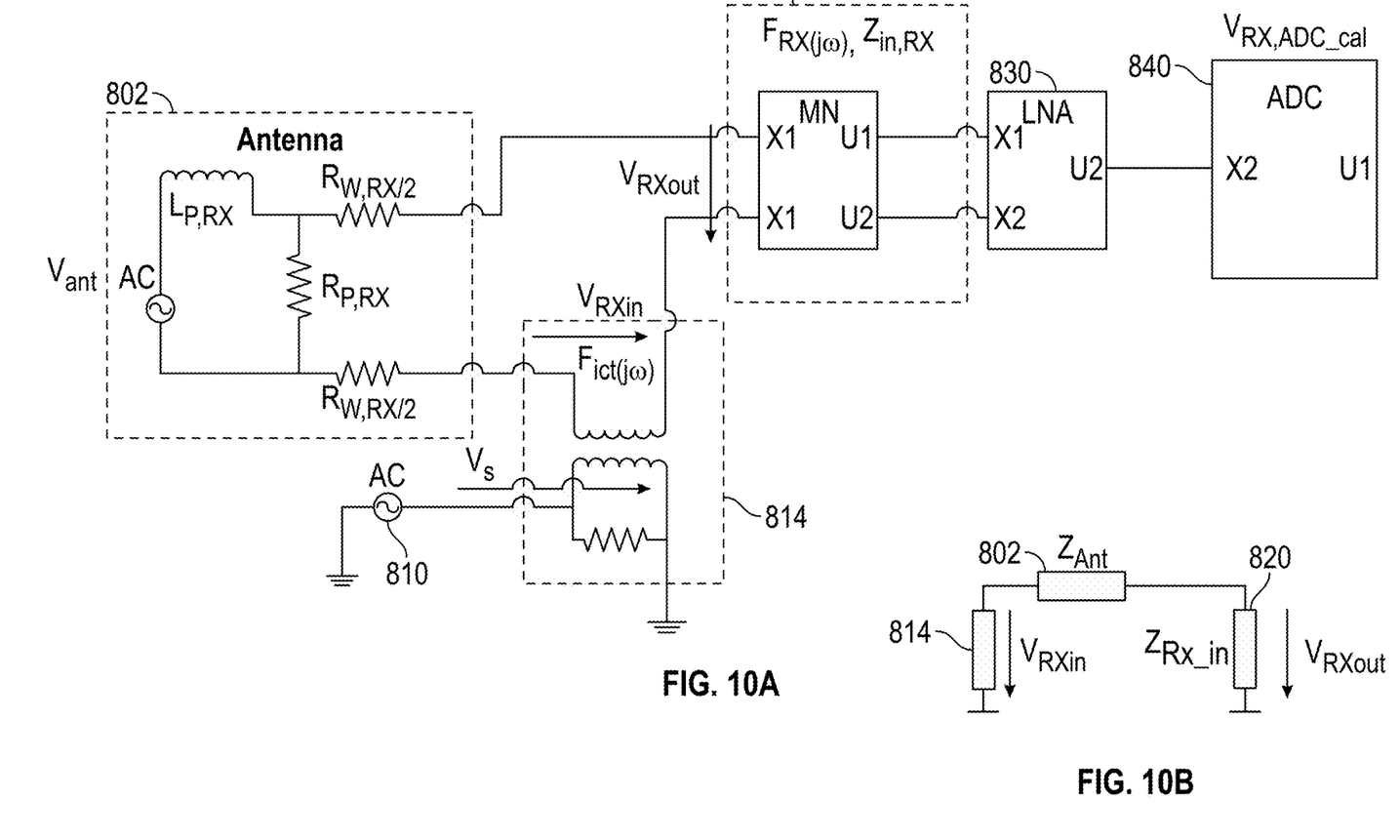
FIG. 10a shows a more detailed version of the system shown FIG. 8.
FIG. 10b shows a simple model of the system shown in FIG. 10.

FIG. 10a shows a more detailed version of the circuit in FIG. 8. In FIG. 10a the antenna 802 includes several elements and provides an output Vrxout to the matching network 820.

FIG. 10b is an equivalent circuit of the antenna 802, coupling transformer 814 and the measuring device 830. The antenna 802 is modelled as impedance (ZAnt) that receives Vrxin from the coupling transformer 814 and provides an output Vrxout to the measurement device which is also modeled as an impedance (Zrx_in). In this simplified model, the matching network 820 is omitted as it can be optional and serves to improve the sensitivity of the bending effects on a received voltage.

With reference now to both FIGS. 10a and 10b, Vrxin is given by:

$$Vrxin = Fict \times Vs$$

where Fict is the transfer function of the coupling transformer 814. Similarly, $$Vrxout = \frac{Z_{Rx\_in}}{Z_{Rx\_in} + Z_{Ant}} \cdot V_{rxin}$$

where the complex antennal impedance (ZAnt) is given by:

$$ZAnt = Rs + j\omega Lp$$

In the above, Lp is a functon of gap width and can be fitted to an exponential function in the form of Lp=1/(e^(gap width). As discussed above, as Lp changes due to the bending, the highly non-linear behavior of the gap influence on to the resulting causes Vrxout to change accordingly due to the simple voltage divider with the input impedance of the measuring device ZRX_in.

Figure 11:
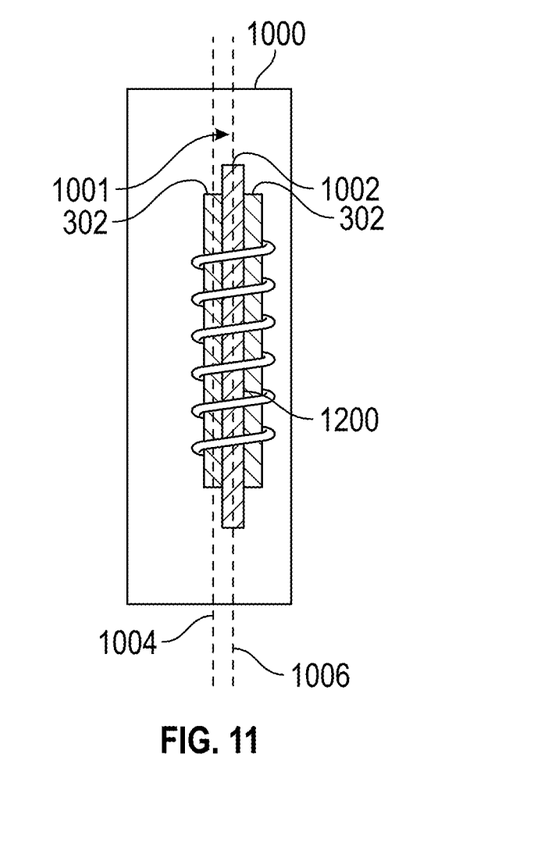
FIG. 11 shows an elongated body that is non-coaxial with a tool.

In another embodiment, as shown in FIG. 11, the electrical conduit/magnetic elements do not necessarily surround the tool 1000. In such an embodiment, the tool 1000 could include a separate bending measurement system 1001 located somewhere in the tool. The separate system could be an elongated body 1002 with magnetic material 302 on its outer surface (elements with gaps or alternative configurations) and a electrical conduit/antenna 1200 surrounding the elongated body. Again, as the tool 1000 bends, the elongated body 1002 with the magnetic material (magnetic elements 302) and the electrical conduit 1200 could be used to detect the bending. As illustrated, the elongated body is not coaxial with the tool. That is, the longitudinal axis 1006 of the elongated body 1002 is not coaxial with the longitudinal axis 1004 of the tool 1000. This off-center location of the system would allow not only to measure bending, but to also determine an azimuthal orientation of the bending. The azimuth is the geographic orientation of the bending (north, east, south, west).

In an embodiment, magnetic elements are only attached to one side of the elongated body to measure the azimuth of the bending thereof. This way the gaps either get smaller or wider depending on the azimuth of the bending. Prior calibration of the antenna will allow determining of the azimuth based on the measured signal property.

In one embodiment attaching only a portion of the magnetic elements 302 shown in FIG. 3 to the drill pipe segment, e.g. covering only 180° of the circumference of the pipe segment, or less, will allow making azimuthal bending measurements for the bending of the pipe segment. Alternatively, attaching strips of the flexible carrier 506 to the body 512 (FIG. 5A), not covering the full circumference of the body will also allow azimuthal bending measurement. In order to be sensitive to different azimuthal orientations of the bending of the body more than one such bending sensor may be incorporated in the pipe segment. The bending sensors may be located at the same longitudinal axial location of the pipe segment, or off-set at different longitudinal axial locations, meaning one bending sensor may be located more downhole or more uphole of the other bending sensor.

Using the receive or transmit antenna of a resistivity tool as bending sensor bears the opportunity to measure bending at different locations along the BHA. Usually, a resistivity tool has more than one receive antenna and more than one transmit antenna along the BHA. Typical distances between the receive or transmit antennas, respectively are distances between 1 m and 5 m, or 5 m and 10 m, or 10 m and 20 m, or 20 m and 30 m. Measuring bending at different positions along the BHA allows observation of the bending loads of the BHA depending on the position on the BHA.

Figure 7:
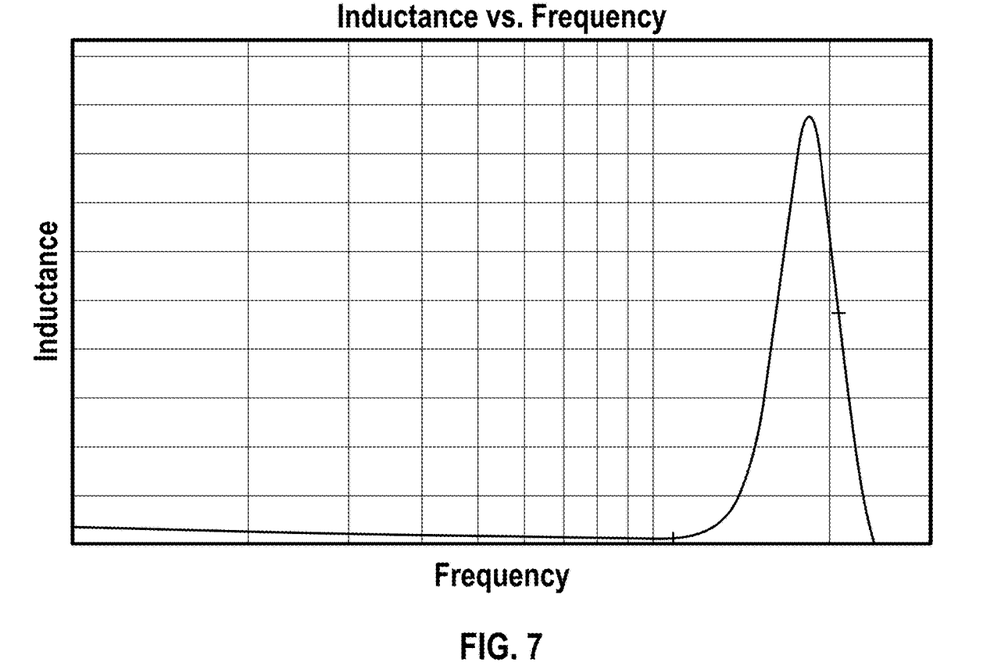
FIG. 7 is a graph showing the relationship between inductance and frequency.

An alternative method to estimate the bending, based on the same phenomena could be a determination of the resonance frequency, when the circuitry, comprising an antenna, the matching network, and a coupling transformer, is considered as an oscillating circuit. The resonance frequency depends in this case on the inductance of the antenna 802 and thus from the bending of the antenna. FIG. 7 shows an example of an inductance versus frequency. Additional circuitry would be needed to induce the oscillation and to measure the frequency of the oscillation.

Embodiment 1. A system for determining bending of a drilling tool includes at least one element attached to the drilling tool and the at least one element includes a magnetic material, and at least one electrical conduit in the drilling tool and electro-magnetically coupled to the at least one element. The system also includes at least one signal source that feeds a signal into the electrical conduit and a measurement system that: measures at least one property of the signal in the electrical conduit as the signal source feeds the signal; and determines the bending of the drilling tool based on the measured property of the signal.

Embodiment 2. The system of any prior embodiment, wherein the at least one element is attached to a surface of the drilling tool and the electrical conduit surrounds at least a portion of the surface with the element attached.

Embodiment 3. The system of any prior embodiment, wherein an operational parameter is manipulated or a measurement of a sensor in the drilling tool is corrected for a bending effect based on the determined bending of the drilling tool.

Embodiment 4. The system any prior embodiment, wherein the downhole tool is a resistivity tool and the electrical conduit is part of an antenna of the resistivity tool.

Embodiment 5. The system of any prior embodiment, wherein the electrical conduit forms a coil.

Embodiment 6. The system of any prior embodiment, wherein the measured property of the signal is one of an attenuation and a phase.

Embodiment 7. The system of any prior embodiment, wherein the at least one element includes a first element and a second element separated by a first gap, the first gap having a first width and wherein the bending of the drilling tool causes the first width to one of increase or decrease.

Embodiment 8. The system of any prior embodiment, wherein the width of the first gap extends along a longitudinal axis of the downhole tool.

Embodiment 9. The system of any prior embodiment, further comprising a third element, the third element separated from at least one of the first and the second element by a second gap, the second gap having a second width, the second width extending in circumferential direction around the surface of the drilling tool.

Embodiment 10. The system of any prior embodiment, wherein the measurement system further determines an azimuth of the bending of the drilling tool.

Embodiment 11. The system of any prior embodiment, wherein the element comprises soft magnetic material.

Embodiment 12. The system of any prior embodiment, wherein an inductance of the electrical conduit changes based on a change in the first width of the first gap due to the bending of the drilling tool.

Embodiment 13. The system of any prior embodiment, wherein the electrical conduit defines an interacting volume and the bending of the drilling tool causes a density of magnetic material in the interacting volume to change.

Embodiment 14. The system of any prior embodiment, wherein the element includes magnetic material disposed in a flexible substrate.

Embodiment 15. The system of any prior embodiment, wherein the bending of the drilling tool causes a density of the magnetic material in the element that is surrounded by the electrical conduit to change.

Embodiment 16. The system of any prior embodiment, wherein the electrical conduit is connected to a matching network, and the electrical conduit is operatively coupled to the signal source.

Embodiment 17. A method of determining a bending of a drilling tool, the method comprising: feeding a signal into an electrical conduit, using a signal source, wherein the electrical conduit is located in the drilling tool; wherein the drilling tool having at least one element attached to it; the at least one element includes a magnetic material; wherein the electrical conduit is electro-magnetically coupled to the at least one element; measuring at least one property of the signal in the electrical conduit as the signal is fed into the electrical conduit; and determining the bending of the drilling tool based on the at least one measured property of the signal.

Embodiment 18. The method of any prior method further comprising: changing an operational parameter of a drilling operation or correcting a measurement of a sensor in the drilling tool for a bending effect based on the determined bending.

Embodiment 19. The method of any prior method wherein the electrical conduit defines an interacting volume and the bending of the drilling tool causes a density of magnetic material in the interacting volume to change.

Embodiment 20. The method of any prior method, wherein the downhole tool is a resistivity tool and the electrical conduit is part of an antenna of the resistivity tool.

Generally, some of the teachings herein are reduced to an algorithm that is stored on machine-readable media. The algorithm is implemented by the computer processing system and provides operators with desired output.

In support of the teachings herein, various analysis components may be used, including digital and/or analog systems. The digital and/or analog systems may be included, for example, in the downhole electronics unit 42 or the processing unit 28. The systems may include components such as a processor, analog to digital converter, digital to analog converter, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs, USB flash drives, removable storage devices, EEPROM, Flash ROM, FRAM, etc.), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A system for determining bending of a drilling tool, the system including:
   at least one element attached to the drilling tool and the at least one element includes a magnetic material;
   at least one electrical conduit in the drilling tool and electro-magnetically coupled to the at least one element;
   at least one signal source that feeds a signal into the electrical conduit, wherein the electrical conduit defines an interacting volume, the interacting volume includes at least a portion of the magnetic material, the electrical conduit also defining a density of magnetic material within the interacting volume; and
   a measurement system that:
      measures at least one property of the signal in the electrical conduit as the signal source feeds the signal based on a change in the density of the magnetic material within the interacting volume; and
      determines the bending of the drilling tool based on the measured property of the signal.

2. The system of claim 1, wherein the at least one element is attached to a surface of the drilling tool and the electrical conduit surrounds at least a portion of the surface with the element attached.

3. The system of claim 2, wherein the electrical conduit forms a coil.

4. The system of claim 2, wherein the at least one element includes a first element and a second element separated by a first gap, the first gap having a first width and wherein the bending of the drilling tool causes the first width to one of increase or decrease.

5. The system of claim 4, wherein the width of the first gap extends along a longitudinal axis of the downhole tool.

6. The system of claim 5, further comprising a third element, the third element separated from at least one of the first and the second element by a second gap, the second gap having a second width, the second width extending in circumferential direction around the surface of the drilling tool.

7. The system of claim 5, wherein the measurement system further determines an azimuth of the bending of the drilling tool.

8. The system of claim 4, wherein an inductance of the electrical conduit changes based on a change in the first width of the first gap due to the bending of the drilling tool.

9. The system of claim 2, wherein the element comprises soft magnetic material.

10. The system of claim 2, wherein the element includes magnetic material disposed in a flexible substrate.

11. The system of claim 10, wherein the bending of the drilling tool causes a density of the magnetic material in the element that is surrounded by the electrical conduit to change.

12. The system of claim 1, wherein an operational parameter is manipulated or a measurement of a sensor in the drilling tool is corrected for a bending effect based on the determined bending of the drilling tool.

13. The system of claim 1, wherein the downhole tool is a resistivity tool and the electrical conduit is part of an antenna of the resistivity tool.

14. The system of claim 1, wherein the measured property of the signal is one of an attenuation and a phase.

15. The system of claim 1, wherein the electrical conduit is coupled to a matching network and the electrical conduit is operatively connected to the signal source.

16. The system of claim 1, wherein the signal source is an electrical signal source and the signal is an electrical signal having a signal frequency.

17. The system of claim 1, wherein the signal source is connected to the electrical conduit by a hard wired connection.

18. A method of determining a bending of a drilling tool, the method comprising:
   feeding a signal into an electrical conduit, using a signal source, wherein the electrical conduit is located in the drilling tool, and defines an interacting volume; wherein the drilling tool has at least one element attached to it; wherein the at least one element includes a magnetic material; wherein the interacting volume includes at least a portion of the magnetic material and the conduit defines a density of magnetic material within the interacting volume; and wherein the electrical conduit is electro-magnetically coupled to the at least one element;
   measuring at least one property of the signal in the electrical conduit as the signal is fed into the electrical conduit based on a change in the density of the magnetic material in the interacting volume; and
   determining the bending of the drilling tool based on the at least one measured property of the signal.

19. The method of claim 18, further comprising:
   changing an operational parameter of a drilling operation or correcting a measurement of a sensor in the drilling tool for a bending effect based on the determined bending.

20. The method of claim 18, wherein the downhole tool is a resistivity tool and the electrical conduit is part of an antenna of the resistivity tool.

* * * * *